United States Patent
Inoue et al.

(10) Patent No.: US 8,339,368 B2
(45) Date of Patent: Dec. 25, 2012

(54) INPUT DEVICE

(75) Inventors: Takefumi Inoue, Nara (JP); Naoki Tatehata, Kyoto (JP)

(73) Assignee: Panasonic Corporation, Osaka (JP)

( * ) Notice: Subject to any disclaimer, the term of this patent is extended or adjusted under 35 U.S.C. 154(b) by 1256 days.

(21) Appl. No.: 11/643,705

(22) Filed: Dec. 22, 2006

(65) Prior Publication Data

US 2007/0164994 A1 Jul. 19, 2007

(30) Foreign Application Priority Data

Jan. 18, 2006 (JP) .................................. 2006-009550

(51) Int. Cl.
*G06F 3/041* (2006.01)

(52) U.S. Cl. ........ 345/173; 345/156; 345/157; 345/168; 345/170; 178/18.01; 178/18.06

(58) Field of Classification Search .......... 345/156–157, 345/168–170, 173–174; 178/18.01–20.04
See application file for complete search history.

(56) References Cited

U.S. PATENT DOCUMENTS

| | | | | |
|---|---|---|---|---|
| 4,892,988 A | * | 1/1990 | Ishii | 200/516 |
| 4,937,932 A | * | 7/1990 | Ishii | 29/622 |
| 5,810,604 A | * | 9/1998 | Kopp et al. | 434/317 |
| 5,909,804 A | * | 6/1999 | Kuratani | 200/516 |
| 5,917,906 A | * | 6/1999 | Thornton | 379/433.07 |
| 5,950,808 A | * | 9/1999 | Tanabe et al. | 200/314 |
| 6,198,060 B1 | * | 3/2001 | Yamazaki et al. | 200/305 |
| 6,625,876 B2 | * | 9/2003 | Ando et al. | 29/622 |
| 6,670,750 B2 | * | 12/2003 | Hanahara et al. | 313/511 |
| 6,704,005 B2 | | 3/2004 | Kato et al. | |
| 6,943,705 B1 | * | 9/2005 | Bolender et al. | 341/33 |
| 7,015,408 B2 | * | 3/2006 | Hirahata et al. | 200/310 |
| 7,312,790 B2 | | 12/2007 | Sato et al. | |
| 7,411,143 B2 | * | 8/2008 | Shin et al. | 200/314 |
| 2002/0049070 A1 | * | 4/2002 | Bick | 455/550 |
| 2003/0025679 A1 | * | 2/2003 | Taylor et al. | 345/175 |
| 2003/0179180 A1 | | 9/2003 | Inamura | |

FOREIGN PATENT DOCUMENTS

| | | |
|---|---|---|
| EP | 0 461 529 A3 | 12/1991 |
| EP | 1 391 905 A1 | 2/2004 |
| GB | 2 412 244 A | 9/2005 |
| JP | 2002-123363 | 4/2002 |
| JP | 2003-280810 | 10/2003 |
| WO | WO 2006/073263 A1 | 7/2006 |
| WO | WO 2006/133922 A1 | 12/2006 |

OTHER PUBLICATIONS

International Search Report and Examination Report issued in corresponding International Patent Application No. GB0700906.1, dated Mar. 22, 2007.

Japanese Office Action issued in Japanese Patent Application No. 2006-009550, mailed Sep. 9, 2010.

* cited by examiner

*Primary Examiner* — Lun-Yi Lao
*Assistant Examiner* — Gregory J Tryder
(74) *Attorney, Agent, or Firm* — McDermott Will & Emery LLP

(57) ABSTRACT

An input device includes an input section formed of a display sheet and a coordinate input sheet, and a switch section allowing a push-input and placed on a substrate at a place corresponding to a display section of the display sheet. A foamed layer containing air and working as an insulating resin layer is placed between the input section and the substrate. The input section is supported via the foamed layer.

10 Claims, 4 Drawing Sheets

INPUT DEVICE

FIELD OF THE INVENTION

The present invention relates to an input device forming an input operating section of various electronic apparatuses.

BACKGROUND OF THE INVENTION

Push buttons are widely used as inputting means of input devices employed in input operating sections of a variety of electronic apparatus. Portable phones are one of instances employing such input devices. Operating such an input device allows inputting telephone numbers.

In recent years, since the access to the Internet has become easier, users can browse the Internet web sites frequently through portable phones, so that the users need to move the cursor on display as they like. Unexamined Japanese Patent Publication No. 2002-123363 discloses an input device for the operation discussed above. This input device is formed by combining a coordinate input unit for moving a cursor on a display with a push-switch input unit for inputting telephone numbers. This conventional input device is described hereinafter with reference to FIG. 6.

FIG. 6 shows a sectional view in part of the conventional input device of which substrate 205 includes conductive units such as a given wiring. On the top surface of substrate 205, center electrode 201 and doughnut-like outer-rim electrode 202, which surrounds center electrode 201, are placed. These electrodes are coupled via through holes 203 to pattern 204 placed on the underside of substrate 205, so that they are led to the outside of the input device.

Diaphragm 206 is made of elastic thin metal plate and has a circular appearance. It forms a movable contact which is shaped like a dome bowing upward. Diaphragm 206 is placed on substrate 205 such that the lower end of its rim touches outer-rim electrode 202, and its top surface is covered with resin sheet 208 made from PET (polyethylene terephthalate). Resin sheet 208 includes adhesive member 207 on its underside. Adhesive member 207 adhesively holds the top surface of diaphragm 206. Adhesive member 207 on the surroundings of diaphragm 206 is stuck to the top surface of substrate 205, so that diaphragm 206 is fixed to and positioned at substrate 205.

Above resin sheet 208 that covers diaphragm 206, coordinate input sheet 209 is placed with a given space in between. Sheet 209 is formed of resin film having a given conductive pattern and integrated with display sheet 211 that is formed on sheet 209 and made of rubber. Although it is not illustrated in the drawings, coordinate input sheet 209 and display sheet 211 integrated with each other are supported at their outer circumferences by a housing of the apparatus so as not to be loosened.

The section of display sheet 211 placed just above diaphragm 206 forms display section 210 slightly rising in sheet 211, and display section 210 has a letter or number displayed on its top surface. The elements discussed above form a part of the conventional input device, and they are placed on a back-to-back basis in, e.g. a portable phone.

Operation of this conventional input device is described hereinafter. Display section 210 having a letter or a number thereon is pushed with a finger, then display sheet 211 bows downward with display section 210 as a center while the circumference of sheet 211 is stretched. Coordinate input sheet 209 also bows downward accordingly until it touches resin sheet 208 that fixes diaphragm 206 to substrate 205.

Further pushing display section 210 turns the center part of diaphragm 206 inside out, i.e. the center part bows downward, and this inside-out movement gives a tactile click impression to a user. Then the underside of the center part touches center electrode 201, which becomes conductive with outer-rim electrode 202 of substrate 205 via diaphragm 206. In other words, respective patterns 204 led to the underside of substrate 205 become shorted.

In this state, the finger is left from display section 210, namely, the pushing force on display section 210 is removed, then diaphragm 206 is restored to its original upwardly bowing domed posture by its own restoring force. This restoring movement of diaphragm 206 upwardly pushes coordinate input sheet 209 and display sheet 211, so that the postures of these elements are restored to the original ones shown in FIG. 6, i.e. the postures taken before the push operation.

A status when a coordinate is input is briefly described hereinafter. Inputting a coordinate is done by touching display sheet 211 with a finger. Since the fingers are conductive, the electrostatic capacity of coordinate input sheet 209 varies depending on the position of the finger touching on sheet 211. The conventional input device detects a coordinate position in the following way: a change in the electrostatic capacity due to a movement of the finger is input from sheet 209 to a controller (not shown) capable of calculating the coordinate position, and the controller processes this input in a given way.

However, since the conventional input device has display sheet 211 made of rubber (elastic material) and coordinate input sheet 209 made from resin film, a touch on display sheet 211 with a finger incurs downward bow of sheet 211. As a result, an interval between coordinate input sheet 209 and the conductive units provided to substrate 205 is changed. This change invites another change in the electrostatic capacity of coordinate input sheet 209. This another change is added to the change, which varies depending on the finger position, in the electrostatic capacity of sheet 209. As a result, an accuracy of detecting a coordinate position based on the change in the electrostatic capacity is lowered.

At the input operation, i.e. pushing display section 210 which has a letter or number thereon, since display sheet 211 is apart from diaphragm 206, the operation sometimes gives an unsteady impression to an operator. A slant pushing on display section 210 pushes it down in the slant direction, so that this push hits a point out of the center of diaphragm 206. As a result, a poor tactile click impression is given to the operator.

SUMMARY OF THE INVENTION

An input device of the present invention comprises the following elements:

an input section allowing a coordinate input by using a change in electrostatic capacity in response to a finger movement and a push-input onto respective display sections on each one of which a mark is shown;

a substrate disposed under the input section with a space and having a conductive unit;

a push-switch section placed on the substrate at a place corresponding to the display section; and an insulating resin layer containing air and placed between the substrate and the input section.

The foregoing structure allows reducing an amount of downward bowing of the input section when a coordinate is input, because the input section is supported by the insulating resin layer which contains air and is placed between the substrate and the input section. The input section is thus hardly affected by the conductive units placed on the substrate, so that the accuracy of detecting the coordinate can be improved. On top of that, at an operation of push-input, the presence of the insulating resin layer allows lessening the adverse effect of a slant push, and the operation becomes more stable.

DETAILED DESCRIPTION OF PREFRRED EMBODIMENT

An exemplary embodiment of the present invention is demonstrated hereinafter with reference to the accompanying drawings.

Figure 1:
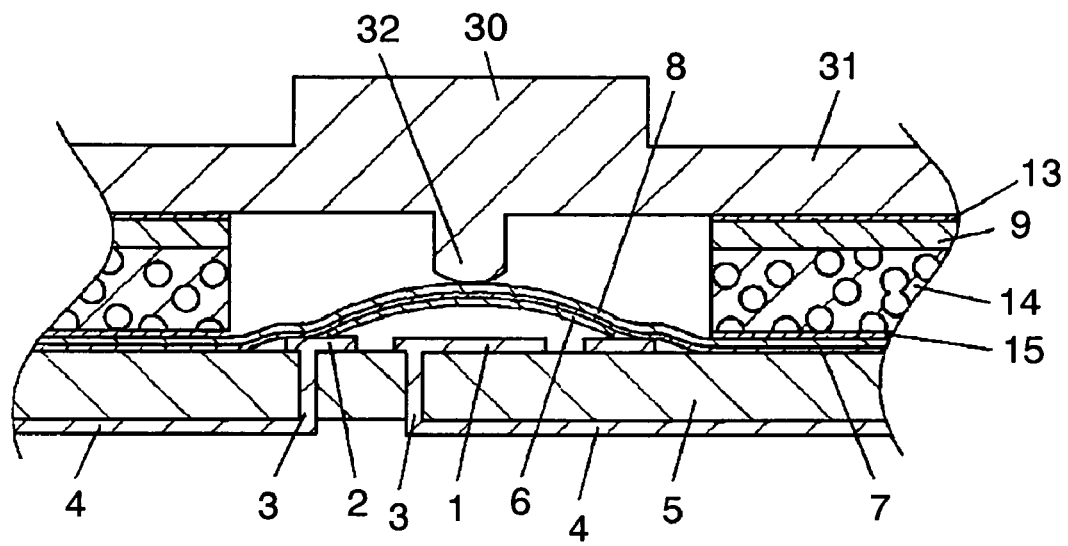
FIG. 1 shows a sectional view in part of an input device in accordance with an exemplary embodiment of the present invention.

FIG. 1 shows a sectional view in part of an input device in accordance with the embodiment of the present invention. As shown in FIG. 1, on the top surface of substrate 5, center electrode 1 and doughnut-like outer-rim electrode 2 surrounding center electrode 1 are placed. These electrodes are coupled via through holes 3 to pattern 4 placed on the underside of substrate 5, so that they are led to the outside of the input device.

Diaphragm 6 made of thin metal plate is prepared such that the lower end of its rim is placed on outer-rim electrode 2, and is fixed to and positioned at substrate 5 by resin sheet 8 made from PET of which underside has adhesive member 7. Diaphragm 6, center electrode 1, and outer-rim electrode 2 form a switch section.

Above diaphragm 6, display sheet 31 forming a sheet member is placed. Display sheet 31 is made of elastic material such as rubber and includes display section 30, of which top surface is the only section exposed, among other elements of the input device, from a housing of the apparatus (not shown).

Display sheet 31 includes pushing section 32 protruding downward from the center of display section 30. The lower end of pushing section 32 touches resin sheet 8 at the point just above the center of diaphragm 6.

Under display sheet 31, coordinate input sheet 9 is placed such that sheet 9 is integrated with sheet 31 by adhesive layer 13 in between. A given conductive pattern is provided to a resin film, thereby forming sheet 9 which works as a coordinate input section that allows inputting a change in electrostatic capacity according to a finger movement. Coordinate input sheet 9 has a similar structure to the conventional one; however, it includes holes, through which pushing section 32 extends, in response to the places of pushing sections 32 of sheet 31. Sheet 9 is thin and inexpensive, so that it can help the input device be thinner and reduce the cost thereof. Display sheet 31 integrated with coordinate input sheet 9 form an input section.

The coordinate input section can employ another form instead of coordinate input sheet 9. In the input section, the coordinate input section is placed below the underside of display sheet 31 in order to avoid a direct touch with a finger onto the coordinate input section. This structure allows preventing the coordinate input section from being deteriorated or dirty. As a result, a long enough service life and high reliability can be ensured with ease.

Foamed layer 14 as an insulating layer containing air is placed beneath coordinate input sheet 9, i.e. between substrate 5 and the input section. Foamed layer 14 is prepared at the places where diaphragms 6 are not formed. The height of foamed layer 14 is designed such that the top surface of layer 14 can support the underside of coordinate input sheet 9. Foamed layer 14 is made by mixing resin paste with microcapsule which generates gas by baking and is made from azo compound and sodium hydrogen carbonate. This mixed material undergoes the screen printing, then is baked to be the foamed layer. Use of such material allows foamed layer 14 to be flexible to adjust its shape or dimensions to what is necessary for the insulating resin.

Instead of foamed layer 14, elastic sponge material such as polyurethane can be bonded on the underside of coordinate input sheet 9. This structure allows reducing the material cost as well as the number of steps in manufacturing. Any insulating resin layer that contains air can be used for this purpose.

Adhesive layer 15 is printed on the underside of foamed layer 14, and layer 15 adhesively fixes resin sheet 8 to foamed layer 14.

As discussed above, the input device of the present invention prepares foamed layer 14 for filling the space between resin sheet 8 placed on substrate 5 and display sheet 31 integrated with coordinate input sheet 9. In other words, both of substrate 5 and the input section formed of display sheet 31 and coordinate input sheet 9 integrated together are fixed to foamed layer 14 which works as an insulating layer. This structure allows display section 30 of display sheet 31 to be positively supported at its center by pushing section 32. The space between resin sheet 8 and coordinate input section 9 placed in surroundings of display section 30 is filled with foamed layer 14, and both of resin sheet 8 and display section 30 are fixed to and supported by foamed layer 14. This structure scarcely invites unsteadiness of display section 30.

Figure 2:
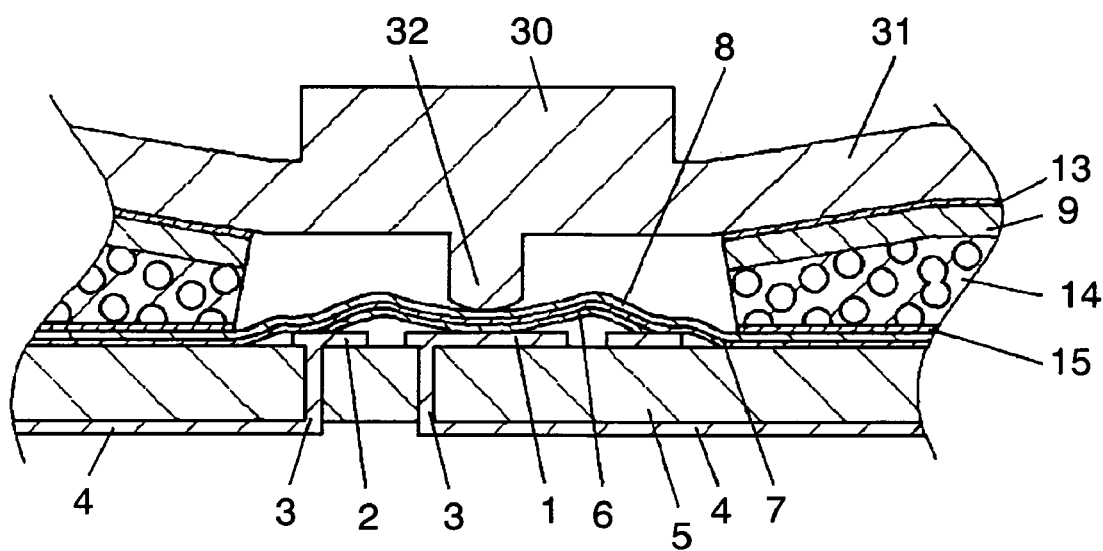
FIG. 2 shows a sectional view illustrating a push operation at the input device in accordance with the exemplary embodiment.

Operation of the input device discussed above is demonstrated hereinafter. First, a push-input given to the input device is detailed with reference to FIG. 2, which shows a sectional view illustrating a push operation onto the input device in accordance with the exemplary embodiment of the present invention. As shown in FIG. 2, display section 30 is depressed while display sheet 31 is stretched at its circumference and simultaneously bows downward with display section 30 as a center. Coordinate input sheet 9 also bows downward. At this time, foamed layer 14 placed on the underside of coordinate input sheet 9 is also compressed.

Pushing force is applied via pushing section 32 to diaphragm 6 in response to the downward movement of display section 30. When the pushing force exceeds a given value, diaphragm 6 turns inside out at its center with its outer circumference lower-end touching outer-rim electrode 2 of substrate 5, so that a tactile click impression is produced. The underside of diaphragm 6 touches center electrode 1 at its center, so that center electrode 1 of substrate 5 becomes shorted with respective patterns 4 led out from outer-rim electrode 2 to the underside of substrate 5.

Compressible amount of foamed layer 14 is set greater than the stroke of diaphragm 6 in order not to affect the movement of diaphragm 6. This preparation allows diaphragm 6 to move smoothly, and it also allows lessening the adverse effect of a slant push on diaphragm 6 because of the compression of foamed layer 14 surrounding diaphragm 6. As a result, the input device produces a better tactile click impression in stable operating condition, and an operator can get better operational feeling.

Display sheet 31 is fixed to and thus supported by substrate 5 via foamed layer 14 at its corresponding part to the circumference of diaphragm 6, so that unsteadiness or shakiness accompanying the depression of display section 30 can be reduced. This structure thus helps the operator get better operational feeling.

Figure 3:
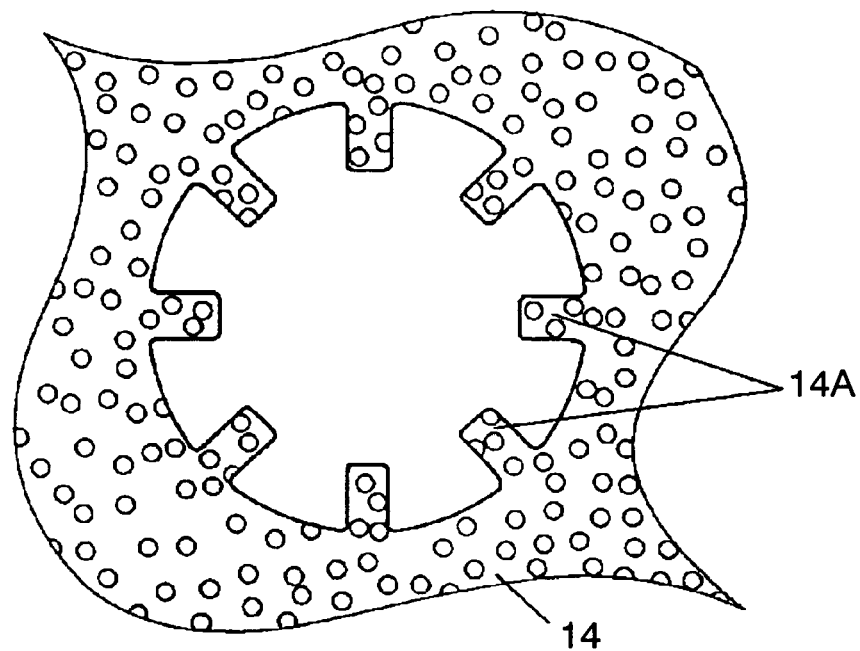
FIG. 3 shows a plan view of a wiring in a foamed layer which is an essential part of the input device in accordance with the embodiment.

FIG. 3 shows a plan view of the foamed layer, and as this drawing illustrates, foamed layer 14 has projections 14A radially arranged, and these projections 14A support the vicinity of circumference of diaphragm 6, so that diaphragm 6 can be supported in part. This structure allows further alleviating the compression load from foamed layer 14 when display section 30 is pushed. As a result, the tactile click impression can be further improved.

Removal of the finger from the pushed posture of display sheet 31 will push up coordinate input sheet 9 and display sheet 31 due to restoring force of diaphragm 6 and foamed layer 14, so that the switch section is restored to its initial position (OFF status) shown in FIG. 1. During this restoring movement, sheets 31 and 9 integrated together are pushed up as a whole by pushing section 32 and foamed layer 14, so that they can be restored more steadily than the conventional one, and the restoring response can be improved.

An input of a coordinate to the input device is demonstrated hereinafter. A touch on display sheet 31 with a finger varies an electrostatic capacity of coordinate input sheet 9 depending on the finger position because the finger is conductive. A change in the electrostatic capacity due to the finger movement is input from sheet 9 to a controller (not shown), which processes the input data in a given way for calculating a coordinate position. This is the same procedure as the conventional one.

However, the input device in accordance with this exemplary embodiment has display sheet 31 supported on and fixed to substrate 5 via foamed layer 14, so that display sheet 31 bows downward less than the conventional one and moves steadier when it is touched with a finger. Coordinate input sheet 9 is held at a given distance from the conductive units such as pattern 4 placed on substrate 5, so that an output from coordinate input sheet 9 is formed of only the change in the electrostatic capacity due to the finger movement, namely, the input section is hard to be affected by the conductive units of substrate 5. As a result, changes in the electrostatic capacity can be steadily output for accurate detection of a coordinate position.

The input device in accordance with this embodiment employs foamed layer 14 that desirably includes much air, and this layer 14 supports coordinate input sheet 9. Since air has a small dielectric constant, the electrostatic capacity of coordinate input sheet 9 is less affected by the conductive units such as pattern 4.

Figure 4:
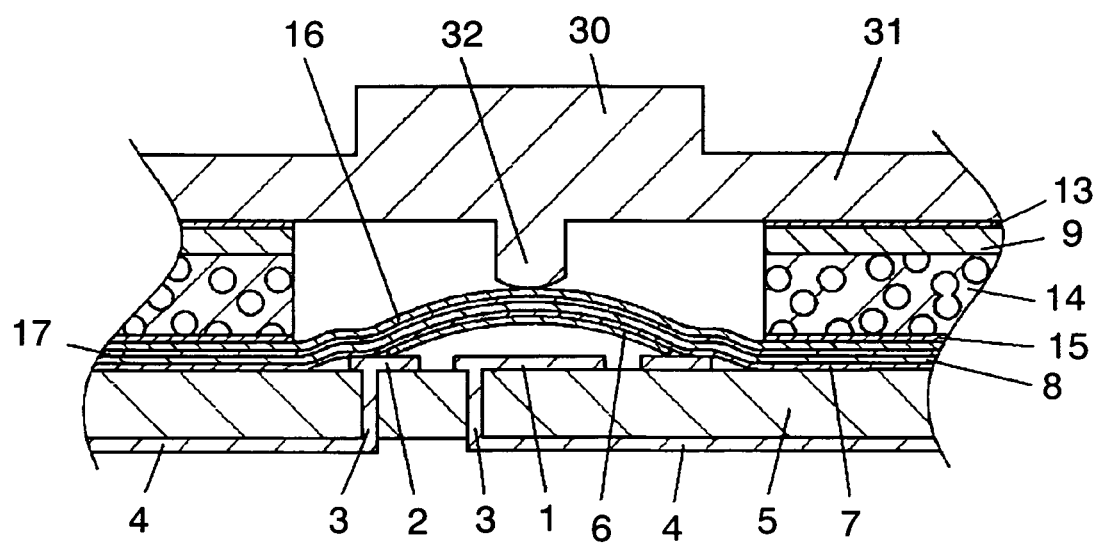
FIG. 4 shows a sectional view of the input device, in accordance with the embodiment, additionally including an EL sheet.

To illuminate the letters or numbers on display section 30, EL (electro-luminescence) sheet 16 is bonded, as the sectional view of FIG. 4 shows, on the top surface of resin sheet 8 via adhesive layer 17. In this structure, pushing section 32 of display sheet 31 is brought into contact with the top surface of EL sheet 16, and foamed layer 14 is placed on the top surface of EL sheet. In other words, the input device in accordance with this embodiment further includes EL sheet 16 between substrate 5 and foamed layer 14 working as an insulating resin layer.

Figure 5A:
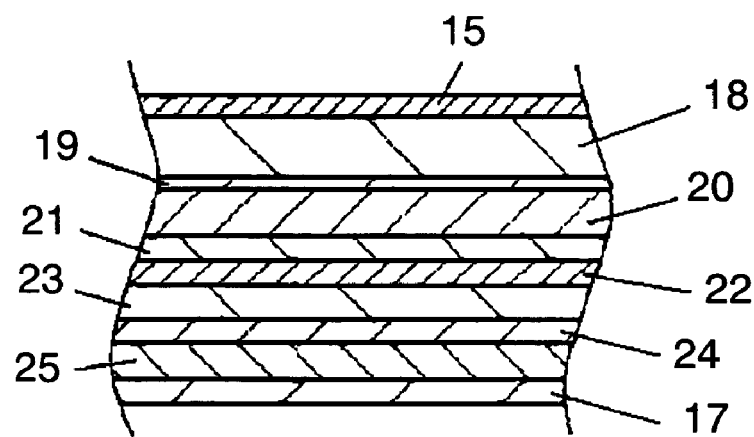
FIG. 5A shows a sectional view of the EL sheet which is an essential part of the input device in accordance with the embodiment.

As shown in FIG. 5A, to form EL sheet 16, transparent electrode 19 is prepared on a base film made from PET. Electrode 19 is made from ITO (indium-tin oxide) or conductive polymer. On the underside of electrode 19, light-emitting layer 20, dielectric layer 21, back electrode 22 made of conductive material, insulating layer 23 made of insulating material, shielding electrode 24 made of conductive material for cutting electromagnetic noises traveling to the lower side, insulating layer 25 made of insulating material are layered in this order. EL sheet 16 thus formed can be bent and is bonded on resin sheet 8 with adhesive layer 17 and placed over diaphragm 6. Dispersion-type EL sheet, of which respective layers have undergone the screen printing, is preferable because it can be more bendable.

Cyclic application of a voltage between transparent electrode 19 and back electrode 22 of EL sheet 16 thus formed allows emitting layer 20 to emit light. The light travels through pushing section 32 and illuminates display section 30. The light can either illuminate display section 30 in part or entire display sheet 31.

Operation of the input device additionally including EL sheet 16 is similar to that of the input device previously discussed, so that the description thereof is omitted here. The input device additionally including EL sheet 16 seems to be affected its electrostatic capacity of coordinate input sheet 9 by conductive transparent electrode 19; however, the presence of foamed layer 14, containing much air that has a small dielectric constant, allows the electrostatic capacity to be less affected. Foamed layer 14 also allows electromagnetic noises, produced by the voltage applied cyclically to EL sheet 16, to less affect coordinate input sheet 9.

Figure 5B:
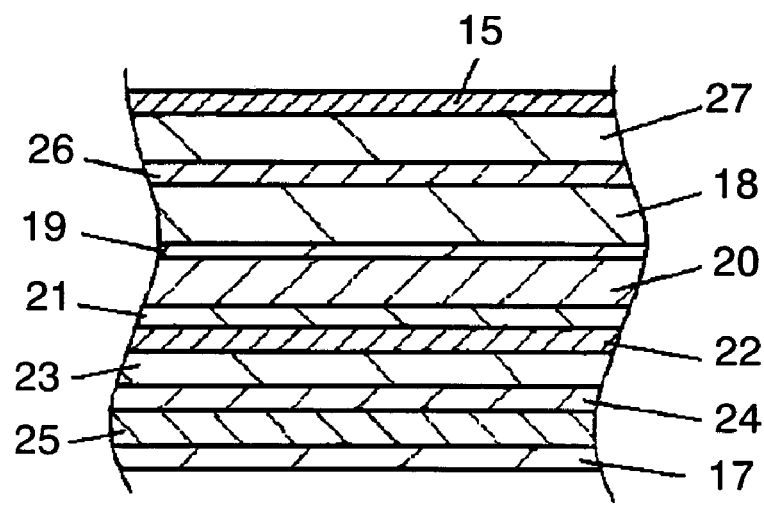
FIG. 5B shows a sectional view of another EL sheet which is an essential part of the input device in accordance with the embodiment.
Figure 6:
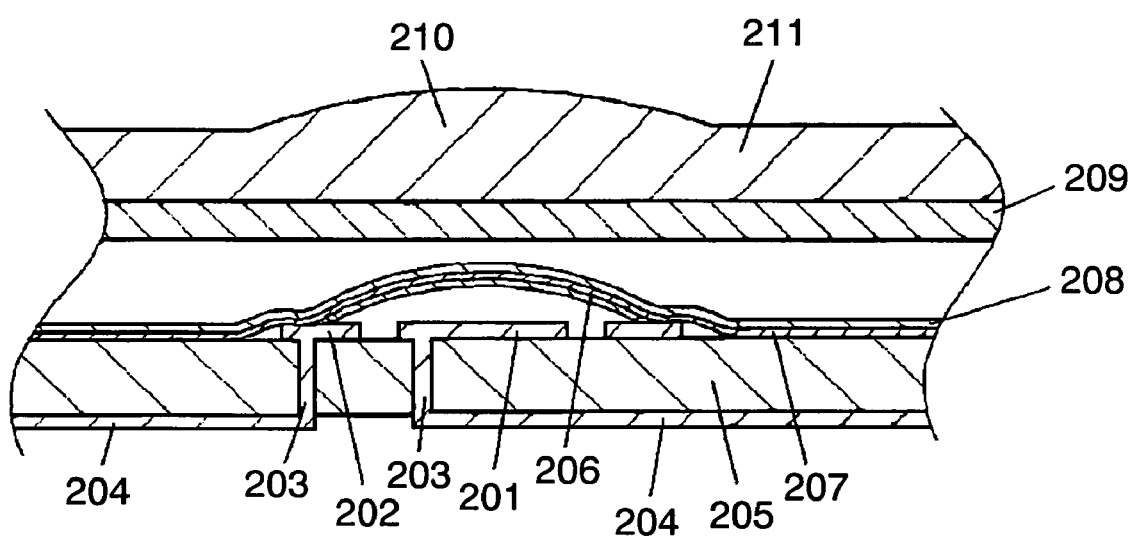
FIG. 6 shows a sectional view in part of a conventional input device.

Here is another structure of EL sheet 16 of which sectional view is shown in FIG. 5B: Shielding layer 26 made of conductive material is printed on the top surface of base film 18, which top surface faces to the input section. Protective layer 27 made of insulating material is placed on shielding layer 26 in order to protect layer 26. Shielding electrode 24 and shielding layer 26 are coupled to the grounding. This structure can prevent the electromagnetic noises, produced by the voltage cyclically applied to EL sheet 16, from dispersing, so that the influence of the electromagnetic noises to coordinate input sheet 9 can be suppressed. As a result, a coordinate position can be detected accurately and steadily.

The input device in accordance with this exemplary embodiment comprises the following elements:
  the input section, formed of display sheet 31 and coordinate input sheet 9, allowing a coordinate input by using a change in electrostatic capacity in response to a finger movement as well as a push-input onto display section 30 on which a mark is shown;
  substrate 5 disposed under the input section with a space and having conductive units such as a wiring pattern;
  the push-switch section disposed on substrate 5 at a place corresponding to display section 30; and
  foamed layer 14 working as an insulating resin layer containing air and placed between substrate 5 and the input section.

In the foregoing structure, foamed layer 14 containing air supports coordinate input sheet 9, and pushing section 32 of display sheet 31 touches resin sheet 8 covering diaphragm 6, so that a coordinate position can be accurately detected, and operational condition can be improved.

Meanwhile the substrate and the input section are not necessarily bonded to the insulating resin layer containing air, and pushing section 32 can be eliminated if the insulating resin layer is resilient enough.

What is claimed is:

1. An input device comprising:
    an input section including a coordinate input sheet which includes a conductive pattern, the input section allowing a coordinate input by using a change in electrostatic capacity in response to a finger movement and a push-input onto a display section on which a mark is shown;
    a substrate having a conductive unit disposed under the input section with a space therebetween;
    a push-switch section disposed on the substrate at a place corresponding to the display section; and
    an insulating resin layer containing sufficient air to reduce the affect of the conductive unit on the electrostatic capacity of the coordinate input sheet, said insulating resin layer being disposed between the substrate and the input section, wherein:
    a height of the insulating resin layer is set so that an upper surface of the insulating resin layer supports a bottom face of the coordinate input sheet so that the coordinate input sheet is held at a given distance from the conductive unit by the insulating resin layer when the coordinate input is performed with the finger moving on the input section while touching the input section, and
    compressible amount of the insulating resin layer is greater than a stroke of the push-switch section.

2. The input device of claim 1 wherein the input section further includes an elastic display sheet including the display section, and the input section is integrated with a coordinate input section which is placed under the elastic display sheet, has the coordinate input sheet, and produces a change in electrostatic capacity according to a finger movement.

3. The input device of claim 2, wherein the coordinate input section is formed of resin film having a given conductive pattern.

4. The input device of claim 1, wherein the insulating resin layer is formed of a spongy member.

5. The input device of claim 1, wherein the insulating resin layer is formed of a foamed layer made by baking resin paste mixed with a foaming agent.

6. The input device of claim 1, wherein the substrate and the input section are fixed to the insulating resin layer.

7. The input device of claim 1 further comprising:
    an EL (electro-luminescence) sheet between the substrate and the insulating resin layer.

8. The input device of claim 7, wherein the EL sheet has a shielding layer on its surface facing to the input section.

9. The input device of claim 1, wherein the insulating resin layer has radially arranged projections protruding to the push-switch section.

10. The input device of claim 1, wherein:
    the push-switch section has a dome-shaped diaphragm made of a thin metal plate,
    the conductive unit of the substrate includes a center electrode disposed at a position corresponding to a top of the diaphragm and an outer-rim electrode contacting a rim of the diaphragm, and
    the compressible amount of the insulating resin layer is greater than a stroke of the diaphragm.

* * * * *